(12) United States Patent
Combs

(10) Patent No.: US 11,448,495 B2
(45) Date of Patent: Sep. 20, 2022

(54) WIRE GAUGE DEVICE AND METHOD OF DETERMINING WIRE GAUGE

(71) Applicant: DOMINION ENERGY, INC., Richmond, VA (US)

(72) Inventor: Norman Dean Combs, Mechanicsville, VA (US)

(73) Assignee: DOMINION ENERGY, INC., Richmond, VA (US)

(*) Notice: Subject to any disclaimer, the term of this patent is extended or adjusted under 35 U.S.C. 154(b) by 8 days.

(21) Appl. No.: 17/322,863

(22) Filed: May 17, 2021

(65) Prior Publication Data

US 2021/0364271 A1 Nov. 25, 2021

Related U.S. Application Data

(60) Provisional application No. 63/028,147, filed on May 21, 2020.

(51) Int. Cl.
*G01B 7/02* (2006.01)

(52) U.S. Cl.
CPC ..................... *G01B 7/02* (2013.01)

(58) Field of Classification Search
CPC ... G01B 7/02; G01B 5/08; G01B 7/12; G01B 3/34
See application file for complete search history.

(56) References Cited

U.S. PATENT DOCUMENTS

| | | | |
|---|---|---|---|
| 1,389,486 A | 8/1921 | Brewer | |
| 4,700,484 A * | 10/1987 | Frank | G01B 11/08 33/780 |
| 5,341,088 A | 8/1994 | Davis | |
| 5,685,085 A | 11/1997 | Bond | |
| 5,884,240 A | 3/1999 | Edgar et al. | |
| 7,721,459 B2 | 5/2010 | Niles | |
| 9,753,461 B1 * | 9/2017 | Johnson | G01R 31/085 |
| 2021/0055093 A1 * | 2/2021 | Logan | G01B 5/08 |

FOREIGN PATENT DOCUMENTS

| | | | | |
|---|---|---|---|---|
| CN | 201600105 | | 10/2010 | |
| CN | 106289001 A | | 1/2017 | |
| CN | 106813555 A | * | 6/2017 | G01B 5/08 |
| CN | 106767466 B | | 3/2018 | |
| CN | 108303008 A | * | 7/2018 | G01B 5/08 |

* cited by examiner

*Primary Examiner* — Son T Le

(74) *Attorney, Agent, or Firm* — Patent Law of Virginia, PLLC; Brian J. Teague

(57) ABSTRACT

A wire gauge measuring device comprises a main body, an arm extending from the main body such that a gap is defined between the arm and the main body, a plurality of switches, and indicator means. The gap has a plurality of differently sized gap portions arranged in decreasing size from a distal end to a proximal of the arm. Each switch is aligned with a corresponding one of the gap portions. The indicator means is adapted to provide an indication to a user based on which of the plurality of switches is depressed. The gap portion sizes are selected such that each gap portion is adapted to (1) receive a corresponding differently sized electrical wire, (2) prevent the corresponding differently sized electrical wire from moving into a smaller sized gap portion, and (3) position the differently sized electrical wire to depress the corresponding switch.

16 Claims, 4 Drawing Sheets

WIRE GAUGE DEVICE AND METHOD OF DETERMINING WIRE GAUGE

CROSS-REFERENCE TO RELATED APPLICATIONS

This application claims priority to pending U.S. Provisional Application Ser. No. 63/028,147, filed May 21, 2020, the contents of which are incorporated herein by reference in its entirety.

FIELD OF THE INVENTION

The present technology relates generally to tools for power line workers, and more particularly to tools for determining the gauge of an electrical wire.

BACKGROUND

Electric utility workers often need to measure the gauge (i.e., size) of a wire or conductor in an electrical distribution system. The wires are typically mounted high up on utility poles, and often need to be measured while electricity is flowing through the wire. Because electricity is flowing through the wire, the electric utility worker must maintain a safe distance from the wire.

Some of the conventional wire gauges for use on live distribution wires are manual and require the user to push up on the wire which is a safety hazard. Some conventional wire gauges have potential for inaccurate readings since they rely on a sliding bar. With some conventional wire gauges, the user has to apply the gauge to the wire using an elongated pole (called a hot stick), lower the gauge and look at it to determine the wire size, then raise the gauge and repeat the process for each additional conductor.

The term "wire gauge" is used conventionally to refer both to wire size and to a device for measuring wire size. To avoid confusion, the term "wire gauge device" will be used herein to refer to a device for measuring wire size.

BRIEF SUMMARY OF THE DISCLOSURE

In one embodiment of the invention, a wire gauge measuring device comprises a main body, an arm extending from the main body such that a gap is defined between the arm and the main body, a plurality of switches, and indicator means. The gap has a plurality of differently sized gap portions arranged in decreasing size from a distal end to a proximal of the arm. Each switch is aligned with a corresponding one of the gap portions. The indicator means is adapted to provide an indication to a user based on which of the plurality of switches is depressed. The gap portion sizes are selected such that each gap portion is adapted to (1) receive a corresponding differently sized electrical wire, (2) prevent the corresponding differently sized electrical wire from moving into a smaller sized gap portion, and (3) position the differently sized electrical wire to depress the corresponding switch.

The indicator means may provide the indication to the user after one of the plurality of switches is depressed for at least a predefined amount of time.

The indicator means may comprise a plurality of indicator lights, each indicator light corresponding to one of the plurality of switches such that each of the plurality of indicator lights illuminates when its corresponding switch is depressed. Each of the plurality of indicator lights may comprise a different colored indicator light.

The indicator means may comprise a multi-color indicator light, each color of the indicator light corresponding to one of the plurality of switches such that each color of the indicator light illuminates when its corresponding switch is depressed.

The indicator means may comprise a digital display to display a predetermined one of a predetermined plurality of standard wire gauges based on which of the plurality of switches is depressed.

The indicator means may comprise a wireless communication module adapted to transmit a predetermined one of a predetermined plurality of standard wire gauges to a receiving device based on which of the plurality of switches is depressed.

The differently sized gap portions may be formed by a plurality of stepped shoulder on the arm and/or the main body.

Alternative embodiments of the invention may comprise methods of determining the gauge of a wire using a device as described herein.

BRIEF DESCRIPTION OF THE SEVERAL VIEWS OF THE DRAWINGS

Reference will now be made to the accompanying drawings, which are not necessarily drawn to scale. The following detailed description of the disclosure will be better understood when read in conjunction with the appended drawings. It should be understood, however, that the disclosure is not limited to the precise arrangements and instrumentalities shown. In the drawings.

DETAILED DESCRIPTION OF THE DISCLOSURE

Figure 1:
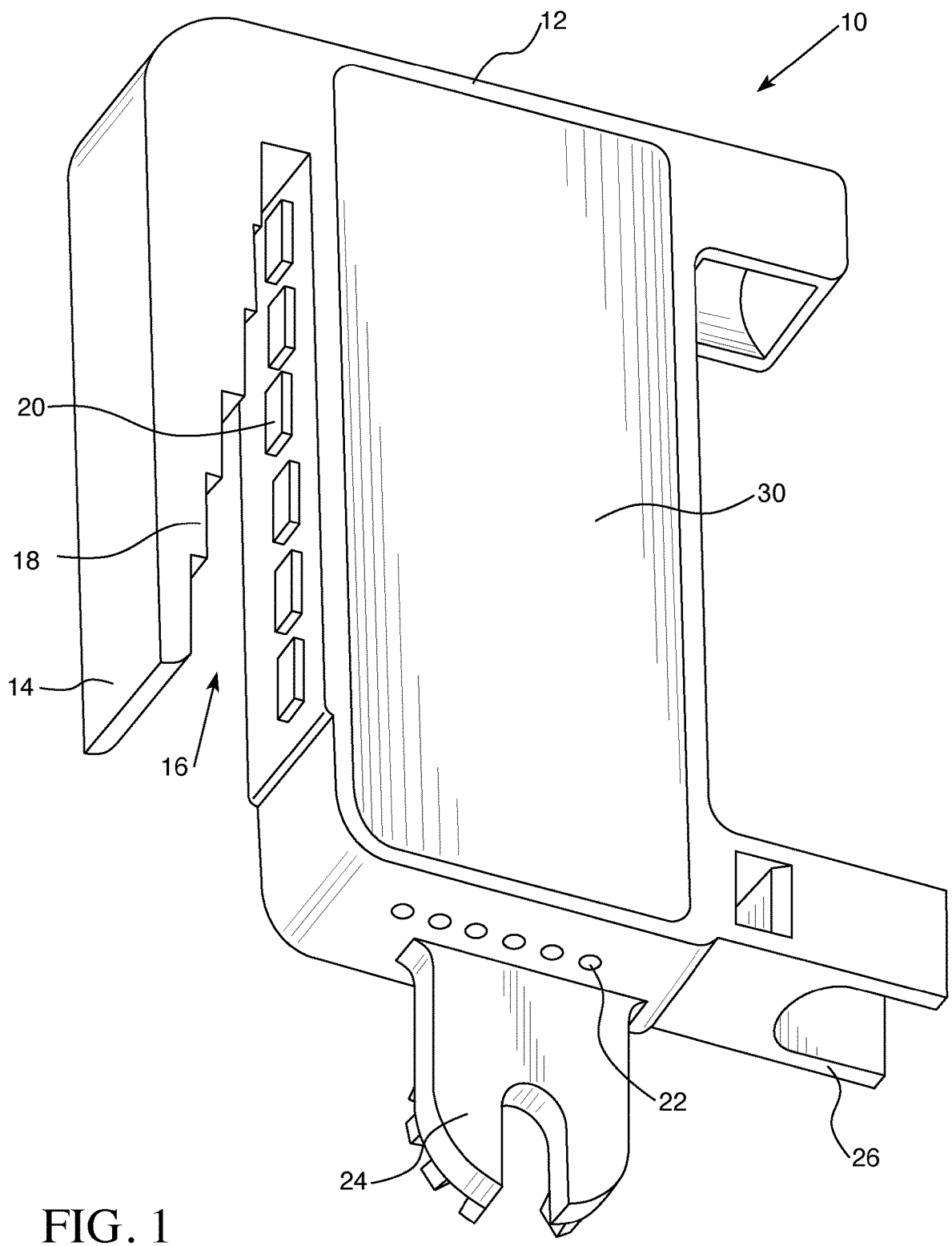
FIG. 1 is a perspective view of a wire gauge measuring device, in accordance with embodiments of the invention.

Certain terminology is used in the following description for convenience only and is not limiting. The words "lower," "bottom," "upper," "top," "left" and "right" and the like designate directions in the drawings to which reference is made. The words "inwardly," "outwardly," "upwardly" and "downwardly" and the like refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Embodiments of the invention are directed to wire gauge devices (i.e., devices for measuring the gauge of a wire) and corresponding methods of measuring the gauge of a wire. As seen in the figures, the wire gauge device 10 of embodiments of the invention comprises a main housing 12 and an arm 14 extending from and generally parallel to a side of the main housing 12. An elongated gap 16 is defined between the arm 14 and one side of the housing 12. The inner surface of the arm 14 comprises a plurality of stepped shoulders 18, such that the gap 16 narrows in a stepped fashion from the distal end to the proximal end of the arm 14 (alternatively, the stepped shoulders may be on the corresponding side of the housing 12 instead of or in addition to the stepped shoulders on the inner surface of the arm 14). In this regard, a plurality of differently-sized gaps portions (six are shown) is defined between the arm 14 and the housing 12. Each gap portion size corresponds to a different wire size. Any suitable number and size of gap portions may be defined, corresponding to any suitable number and size of wires. In one exemplary embodiment of the invention, the device includes only gap portion sizes that correspond to wire sizes that are commonly used in an electrical distribution system.

The wire gauge device of embodiments of the invention may be selectively attachable to a hot stick (i.e., an insulated pole used by electric utility workers when working on energized high-voltage electric power lines) and/or a telescoping measuring stick to enable a utility worker to safely raise the device up to the wire to be measured. The device 10 comprises a hot stick universal attachment point 24 to attach the device to a hot stick and a loop and notch attachment mechanism 26 to attach the device to a telescoping measuring stick.

Figure 3:
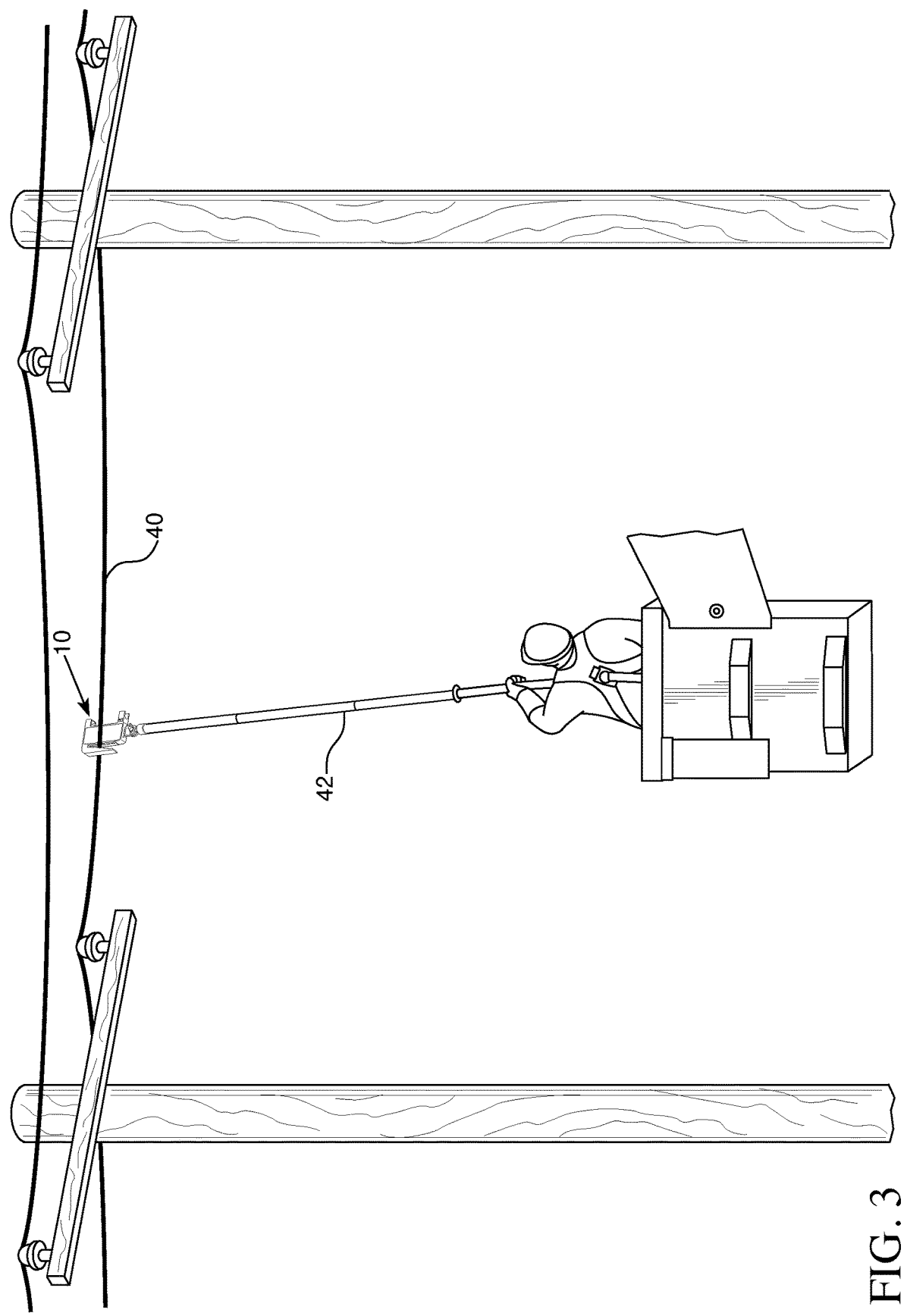
FIG. 3 shows a power line worker using the wire gauge device of FIG. 1 to measure the gauge of a wire.
Figure 4:
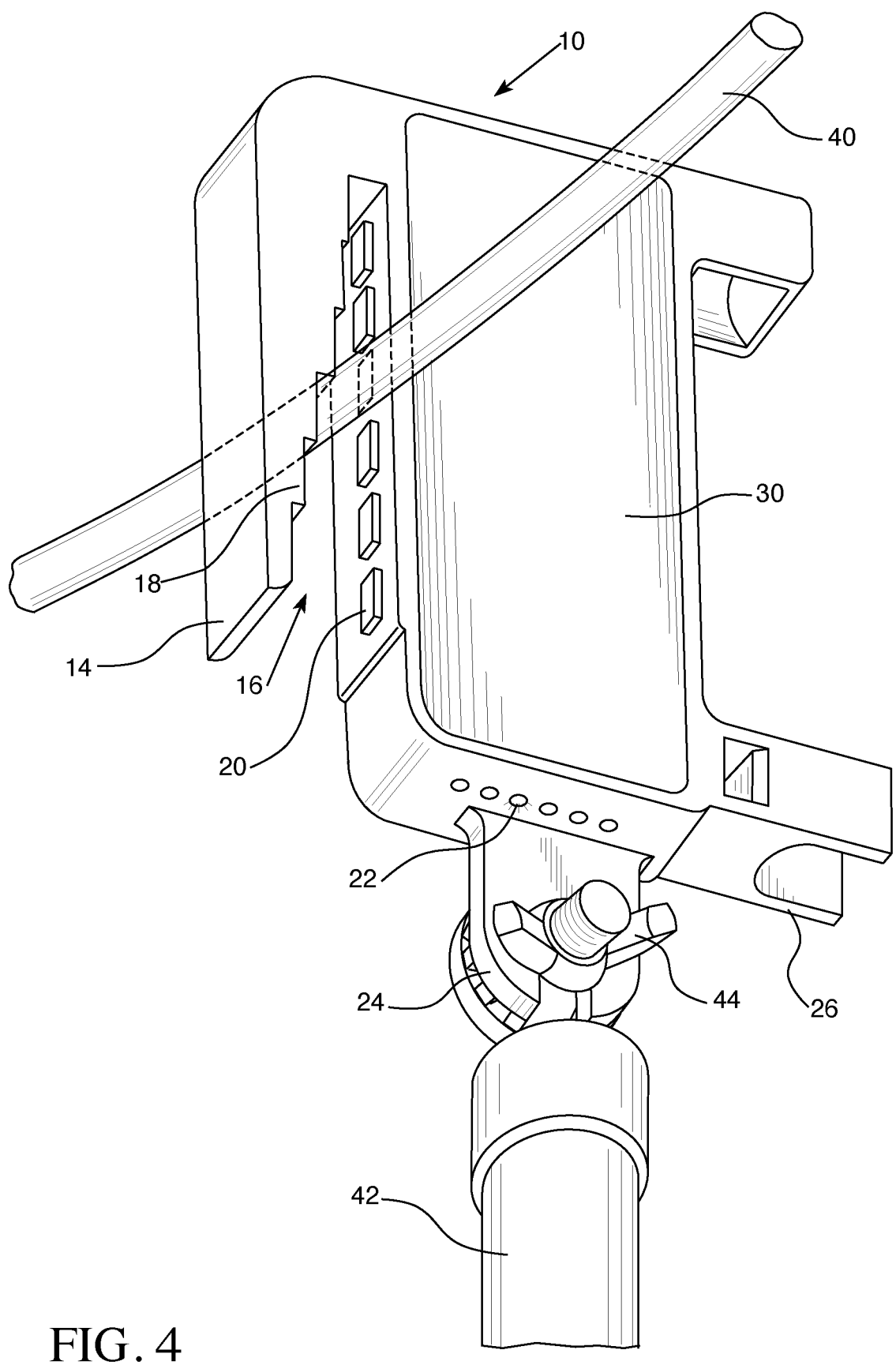
FIG. 4 is a close-up view of the wire gauge device of FIG. 1 in use.

As seen in FIGS. 3 and 4, an electric utility worker attaches the device 10 to a hot stick 42 or a telescoping measuring stick or the like (a wing nut 44 or the like may be used to secure the device 10 to the hot stick 42 via the attachment point 24), raises the device 10 to a position just above a wire 40 (energized or non-energized) to be measured (in FIG. 3, the electric utility worker is shown in the bucket of a bucket truck), and then lowers the device 10 onto the wire 40 such that the wire enters the gap 16 defined between the arm 14 and the housing 12. As the device 10 is lowered and the wire 40 slides into the gap 16, the wire 40 is stopped from advancing into the gap 16 when the wire 40 reaches the one of the differently-sized gap portions in the device that corresponds to the size of the wire 40 being measured, thereby correctly identifying the size of the wire 40. In other words, the wire slides through and past the gap portions that correspond to larger wire sizes and is unable to slide into the gap portions that correspond to smaller wire sizes, such that the wire stops at the gap portion corresponding to the wire's size.

Figure 2:
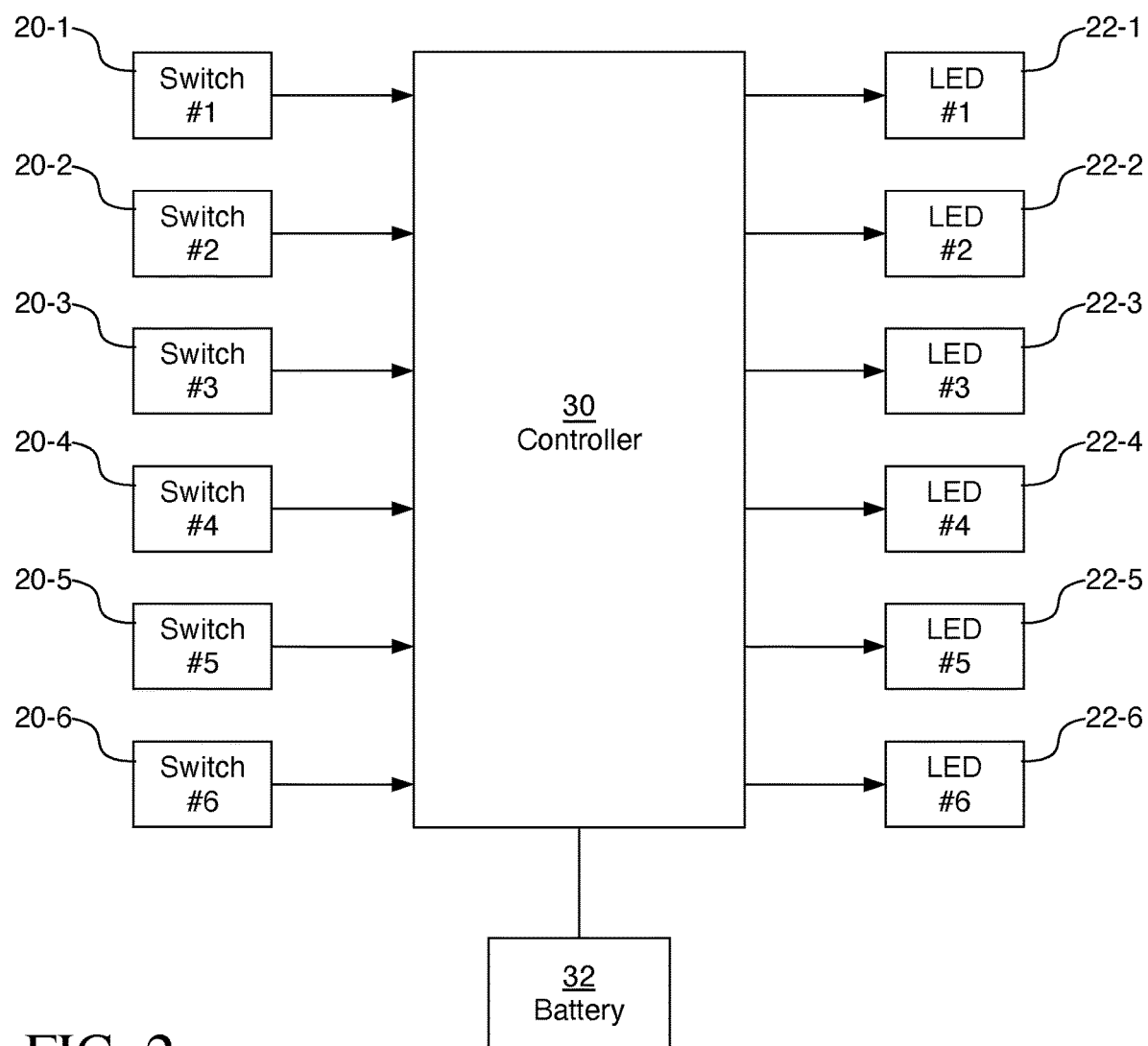
FIG. 2 is a functional block diagram of the wire gauge measuring device of FIG. 1.

Within each differently-sized gap portion is a pushbutton switch 20 (which may also be simply termed either a pushbutton or a switch) that is depressed by the wire resting against the button when the wire is in that gap. Any suitable type of pushbutton switch may be used, but preferably a normally open, momentary (non-latching) pushbutton switch is used. Each pushbutton switch 20 is electrically connected to a respective colored light emitting diode (LED) 22 that is positioned on the bottom surface of the housing. Any suitable electrical arrangement between the pushbutton switches 20 and the LEDs 22 may be used. For example, each pushbutton switch 20 may be wired directly to a corresponding LED 22. FIG. 2 illustrates a more complex arrangement that may provide additional functionality, as described below. As seen in FIG. 2, each of the pushbutton switches 20-1 through 20-6 is connected to a controller 30, and each of the LEDs 22-1 through 22-6 are also connected to the controller 30. The controller 30 may receive an input from one of the pushbutton switches and activate a corresponding one of the LEDs. The controller may comprise a microprocessor, dedicated or general purpose circuitry (such as an application-specific integrated circuit or a field-programmable gate array), a suitably programmed computing device, or any other suitable means for controlling the operation of the device.

In one exemplary embodiment of the invention, the color of each LED corresponds to a sleeve color coding system for each respective wire size (e.g., #2 Al illuminates red, 4/0 or 246 Al illuminates pink, etc.). The circuitry/wiring/controller between the switches and the LEDs, along with one or more batteries 32 to power the LEDs, are located within an inner chamber of the housing 12, which is concealed by cover plate 30.

When the wire stops at the gap corresponding to the wire's size, the wire depresses the corresponding pushbutton switch and illuminates the corresponding LED. Since the LEDs are positioned on the bottom surface of the housing 12, the worker standing below holding the hot stick can readily see which color LED is illuminated and therefore determine the wire size.

In addition to the plurality of differently colored LEDs as described above, any other suitable indicator mechanisms and methods may be used to communicate the wire size from the device to the user. For example, a single, multi-color LED (not illustrated) may be used instead of multiple single-color LEDs. As another example, the device may wirelessly communicate (e.g., via Bluetooth or the like) the wire size to a corresponding device (e.g., smartphone and app) (not illustrated) accessible to the user. As yet another example, the device may comprise a digital readout (not illustrated) that is sufficiently sized to be readable at a distance. In another example, an audible indication of the wire size may be produced by the device or by a corresponding device (e.g., smartphone and app) accessible to the user. In some embodiments of the invention, the device may "hold" the wire size reading (i.e., maintain the reading on the device), such as for a predetermined length of time or until cleared by the user (such as by pressing a "clear" or "reset" button), to enable the user to read the wire size off the device after having lowered the device from the wire. Such a "hold" function may be automatic (e.g., activates when one of the plurality of pushbuttons has been depressed for a predefined period of time (e.g., three seconds)) or may be activated by the user (e.g., via a remotely operated hold button). In some embodiments of the invention, the device may not register the wire size until the pushbutton switch has been depressed for a predefined period of time (e.g., three seconds), such that the wire size does not register as the user is sliding the device onto the wire and the wire hits any of the pushbuttons corresponding to the larger gap portions prior to reaching the gap portion corresponding to the size of the wire being measured.

The wire gauge device of embodiments of the invention enables designers to simultaneously measure conductor heights and confirm the gauge of the conductor. This will make design calculations more accurate, resulting in more efficient designs and increased reliability. Better information leads to better designs. Wrong conductor sizes when calculating designs can lead to inadequate guying, inefficient overbuilding of poles, joint use (JU) violations, incorrect sagging of wire, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. A wire gauge measuring device comprising:
    a main body;
    an arm extending from the main body such that a gap is defined between the arm and the main body, the gap having a plurality of differently sized gap portions arranged in decreasing size from a distal end to a proximal of the arm;
    a plurality of switches, each switch aligned with a corresponding one of the gap portions; and
    indicator means adapted to provide an indication to a user based on which of the plurality of switches is depressed;
    wherein the gap portion sizes are selected such that each gap portion is adapted to (1) receive a corresponding differently sized electrical wire, (2) prevent the corresponding differently sized electrical wire from moving into a smaller sized gap portion, and (3) position the differently sized electrical wire to depress the corresponding switch.

2. The wire gauge measuring device of claim 1, wherein the indicator means provides the indication to the user after one of the plurality of switches is depressed for at least a predefined amount of time.

3. The wire gauge measuring device of claim 1, wherein the indicator means comprises a plurality of indicator lights, each indicator light corresponding to one of the plurality of switches such that each of the plurality of indicator lights illuminates when its corresponding switch is depressed.

4. The wire gauge measuring device of claim 3, wherein each of the plurality of indicator lights comprises a different colored indicator light.

5. The wire gauge measuring device of claim 1, wherein the indicator means comprises a multi-color indicator light, each color of the indicator light corresponding to one of the plurality of switches such that each color of the indicator light illuminates when its corresponding switch is depressed.

6. The wire gauge measuring device of claim 1, wherein the indicator means comprises a digital display to display a predetermined one of a predetermined plurality of standard wire gauges based on which of the plurality of switches is depressed.

7. The wire gauge measuring device of claim 1, wherein the indicator means comprises a wireless communication module adapted to transmit a predetermined one of a predetermined plurality of standard wire gauges to a receiving device based on which of the plurality of switches is depressed.

8. The wire gauge measuring device of claim 1, wherein the differently sized gap portions are formed by a plurality of stepped shoulder on the arm and/or the main body.

9. A method of measuring a gauge of an electrical wire, the method comprising:
    (a) affixing a wire gauge measuring device to one end of an elongated pole, the wire gauge measuring device comprising:
        a main body;
        an arm extending from the main body such that a gap is defined between the arm and the main body, the gap having a plurality of differently sized gap portions arranged in decreasing size from a distal end to a proximal of the arm;
        a plurality of switches, each switch aligned with a corresponding one of the gap portions; and
        indicator means adapted to provide an indication to a user based on which of the plurality of switches is depressed;
        wherein the gap portion sizes are selected such that each gap portion is adapted to (1) receive a corresponding differently sized electrical wire, (2) prevent the corresponding differently sized electrical wire from moving into a smaller sized gap portion, and (3) position the differently sized electrical wire to depress the corresponding switch;
    (b) manipulating the pole to manipulate the wire gauge measuring device such that the electrical wire to be measured enters the gap between the main body and the arm and moves toward the proximal end of the arm into the smallest sized gap portion which the electrical wire can enter.

10. The method of claim 9, wherein the indicator means provides the indication to the user after one of the plurality of switches is depressed for at least a predefined amount of time.

11. The method of claim 9, wherein the indicator means comprises a plurality of indicator lights, each indicator light corresponding to one of the plurality of switches such that each of the plurality of indicator lights illuminates when its corresponding switch is depressed.

12. The method of claim 11, wherein each of the plurality of indicator lights comprises a different colored indicator light.

13. The method of claim 9, wherein the indicator means comprises a multi-color indicator light, each color of the indicator light corresponding to one of the plurality of switches such that each color of the indicator light illuminates when its corresponding switch is depressed.

14. The method of claim 9, wherein the indicator means comprises a digital display to display a predetermined one of a predetermined plurality of standard wire gauges based on which of the plurality of switches is depressed.

15. The method of claim 9, wherein the indicator means comprises a wireless communication module adapted to transmit a predetermined one of a predetermined plurality of standard wire gauges to a receiving device based on which of the plurality of switches is depressed.

16. The method of claim 9, wherein the differently sized gap portions are formed by a plurality of stepped shoulder on the arm and/or the main body.

* * * * *